F. L. SESSIONS.
ELECTRIC LAPWELDING MACHINE.
APPLICATION FILED AUG. 5, 1913.
1,177,726.
Patented Apr. 4, 1916.
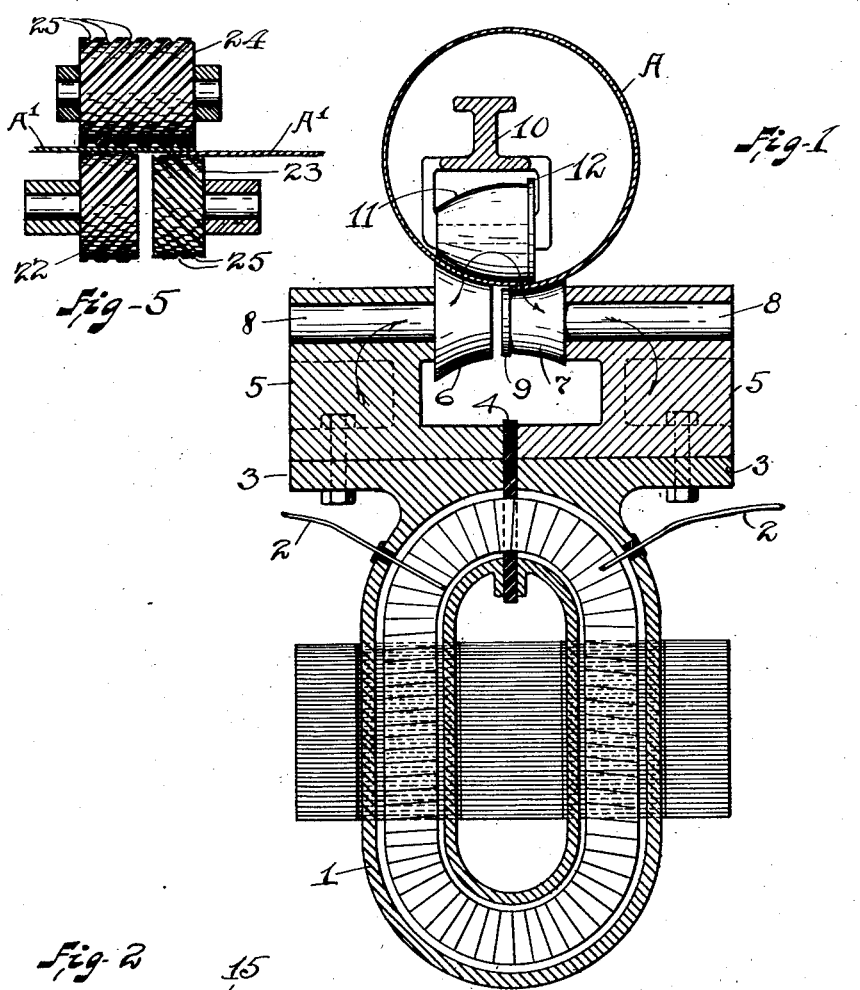
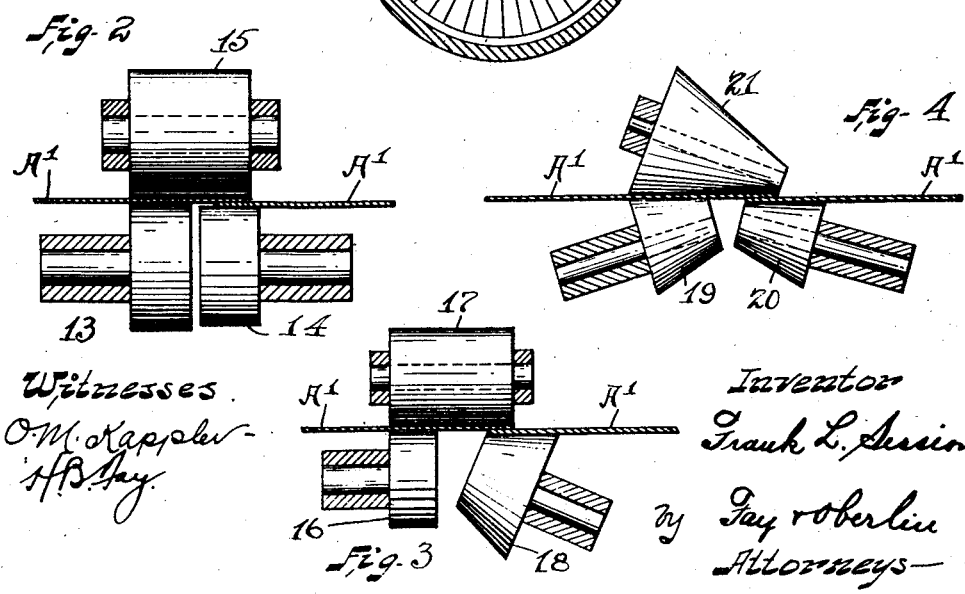

UNITED STATES PATENT OFFICE.

FRANK L. SESSIONS, OF LAKEWOOD, OHIO, ASSIGNOR TO THE STANDARD WELDING COMPANY, OF CLEVELAND, OHIO, A CORPORATION OF OHIO.

ELECTRIC LAPWELDING-MACHINE.

1,177,726.      Specification of Letters Patent.      Patented Apr. 4, 1916.

Application filed August 5, 1913. Serial No. 783,028.

*To all whom it may concern:*

Be it known that I, FRANK L. SESSIONS, a citizen of the United States, and a resident of Lakewood, county of Cuyahoga, and State of Ohio, have invented a new and useful Improvement in Electric Lapwelding-Machines, of which the following is a specification, the principle of the invention being herein explained and the best mode in which I have contemplated applying that principle, so as to distinguish it from other inventions.

One well known method of electrically welding together separate sheets of metal, or the edges of a single sheet re-doubled to form a tube or like article, is the so-called "lap welding" method, wherein the edges of such sheets or single re-doubled sheet, are caused to slightly overlap and a heating electric current is then passed through the same, sufficient heat being developed by the resistance of the metal and of the joint to cause the fusion of the contacting faces and their more or less homogeneous union. Ordinarily, in practising this method two electrodes are employed, one contacting with the outer face of the one sheet, or sheet portion adjacent to the edge to be thus welded, and the other contacting with the oppositely disposed face of the other sheet, or sheet portion. This arrangement is rather inconvenient when dealing with tubular articles and makes it necessary if such articles are of any considerable length to carry the current to the one electrode through a corresponding distance with consequent loss and other attendant difficulties.

The object of the present invention is to provide an apparatus whereby the necessity of having an electrode on the inwardly directed face of the sheet entering into the formation of the tube may be obviated.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but several of the various mechanical forms in which the principle of the invention may be used.

In said annexed drawing: Figure 1 is a transverse cross-section of an apparatus embodying my present improvements, such apparatus being shown more or less in diagrammatic form and with a section of tubing being welded similarly shown in place on said apparatus; Fig. 2 is a view similar to Fig. 1 showing a portion of the apparatus with certain modifications introduced; and Figs. 3, 4 and 5 illustrate other possible modifications of the same portion of the apparatus.

The transformer 1, illustrated in Fig. 1 of the foregoing series, is of a typical form, it being understood that in a welding operation, such as that under consideration, a current of low potential and relatively large amperage is desirable. Such a transformer is accordingly ordinarily incorporated directly in the welding apparatus. The current is conducted to the transformer by the primary wires 2, 2 and is led therefrom, to the electrodes presently to be described, by cast copper or brass secondary arms 3, 3, which are, in effect, portions of the transformer structure but suitably insulated from each other at 4, as shown in the figure just referred to.

Directly mounted upon the secondary arms 3, 3 are two similar brackets 5, 5 which are in electrical connection with said arms and also with two rollers 6 and 7 rotatably supported in said brackets on spindles 8, 8. These rollers are desirably of cross sectional form complementary to the outer surface of the article, or articles, to be welded. Such article is shown in the present instance as consisting of a tube formed of a single rolled up sheet A and the faces of the rolls are accordingly of concavely curved conical form, the one roller in addition having a rib 9 at its smaller end which is adapted to engage with the edge of the outer sheet portion that enters into the lap joint.

Suitably supported within the tube that is being welded, as by an arm or longitudinally extending bracket 10 is a third roller 11 that is made of convexly curved shape to conform to the inner surface of the tube, such roller likewise having a rib 12 similar to the rib 9 on roller 7, which rib 12 engages the edge of the inner sheet portion. Said roller 11 is so disposed that the larger portion of its face is in contact with the portion of the sheet that is exteriorly supported by the roller 6.

All three of the aforesaid rollers 6, 7 and 11 are constructed of low resistance conducting material so that the current from the one secondary 3 may readily flow through roller 6 and the intervening portion of the sheet to such roller 11 and thence through the overlapping edge portions of the sheet to the roller 7 and the other secondary 3. By reason of the close fitting character of all three rollers, their low electrical resistance, and the considerable extent of the bearing surfaces of rollers 6 and 11, no particular heating effect is produced in the portion of the sheet that is held between said rollers, but the overlapping portions of the sheet lying between said roller 11 and the roller 7 are more restricted in area, offer considerable electrical resistance, and being furthermore separated by an additional joint, sufficient heat is developed by the passage of the current through such overlapping sheet portions to fuse the same.

In Fig. 2, I show rollers 13, 14 and 15 which correspond in general to rollers 6, 7 and 11 just described, but which are modified in form to meet the requirements where flat sheets A' are being welded together. Such rollers 13, 14 and 15 are here shown as being simply plain cylindrical rollers, their relative disposition and the areas of their contacting surfaces, however, remaining substantially the same as in the first described construction. Instead of all the rollers being of cylindrical form, as shown in Fig. 2, two of them (16 and 17) may be cylindrical and the third 18 may be conical, as shown in Fig. 3, or all three rollers 19, 20 and 21 may be of conical form as shown in Fig. 4, it being understood that where conical rollers are employed their axes will be properly disposed with reference to the plane of the sheets or other articles being welded together to bring their contacting faces into good electrical contact with such sheets. These conical rolls, I have found will tend to remove from the contact surfaces of the sheets any oil and grease, scale, or the like, which might prevent the ready flow of current.

Fig. 5 illustrates a form of apparatus similar to that shown in Fig. 2, viz., one adapted for lap welding flat sheets together, but the rollers 22, 23 and 24 differ from those shown in said Fig. 2, by having their faces formed with helical or equivalent threads 25, more or less closely placed together as shown. In addition to conducting the current to the portion of the sheets wherewith they contact, such threaded or grooved rollers will have a mechanical action on the portions of the sheets wherewith they contact, the grooves tending to pick up and brush aside any foreign matter on the surface of the sheets, such as oxid, and thus insuring a better contact between the rollers and such sheets and serving the same purpose in this respect as the angularly set rolls.

The operation of my improved apparatus is believed to be clearly enough set forth in connection with the foregoing description of the several forms which the apparatus may take and particularly of the form shown in Fig. 1. It will be understood that the arm 10 is exteriorly supported either rigidly or flexibly so as to maintain the roller 11 in proper place within the tube while the edges of the latter are being welded together. It is furthermore contemplated in the form of apparatus just referred to that the work, that is such tube, will be moved with reference to the apparatus, although this is a matter of indifference and the movement may be reversed if found desirable.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of conductor members adapted to contact with opposite sides of the article being welded, said members being arranged so that a lap joint may be passed through between the same; and means adapted to engage the edges of the article forming such joint to properly guide such article.

2. In mechanism of the character described, the combination of conductor members adapted to contact with opposite sides of the article being welded, said members being arranged so that a lap joint may be passed through between the same; and ribs on said members adapted to engage the respectively adjacent edges of the article entering into such joint.

3. In mechanism of the character described, the combination with two electrodes connected with opposite electric poles and supported adjacent to, but out of contact with, each other; of a conductor member adapted to bridge the space between said electrodes, so that when an article to be welded is passed through between said electrodes on one side and said member on the other, the current may pass from one electrode successively through one portion of such article, said member, and another portion of such article to said other electrode, one of said electrodes being spaced farther from said member than the other, whereby a lap joint may be passed through between such electrode and member; and means adapted to engage the edges of the article forming such joint to properly guide such article.

4. In mechanism of the character described, the combination with two electrodes connected with opposite electric poles and supported adjacent to, but out of contact with, each other; of a conductor member adapted to bridge the space between said electrodes, so that when an article to be welded is passed through between said electrodes on one side and said member on the other, the current may pass from one electrode successively through one portion of such article, said member, and another portion of such article to said other electrode, one of said electrodes being spaced farther from said member than the other, whereby a lap joint may be passed through between such electrode and member, and such electrode and member having ribs adapted to engage the respectively adjacent edges of the article entering into such joint.

5. In mechanism of the character described, the combination with two roller electrodes connected with opposite electric poles and supported adjacent to, but out of contact with, each other; of a third conductor roller adapted to bridge the space between said electrode rollers, so that when an article to be welded is passed through between said electrode rollers on one side and said conductor roller on the other, the current may pass from one electrode roller successively through one portion of such article, said conductor roller, and another portion of such article, to said other electrode, one of said electrode rollers being spaced farther from said conductor roller than the other, whereby a lap joint may be passed through between said rollers.

6. In mechanism of the character described, the combination with two roller electrodes connected with opposite electric poles and supported adjacent to, but out of contact with, each other; of a third conductor roller adapted to bridge the space between said electrode rollers, so that when an article to be welded is passed through between said electrode rollers on one side and said conductor roller on the other, the current may pass from one electrode roller successively through one portion of such article, said conductor roller, and another portion of such article, to said other electrode, one of said electrode rollers being spaced farther from said conductor roller than the other, whereby a lap joint may be passed through between said rollers; and means adapted to engage the edges of the article forming such joint to appropriately guide such article.

7. In mechanism of the character described, the combination with two roller electrodes connected with opposite electric poles and supported adjacent to, but out of contact with, each other; of a third conductor roller adapted to bridge the space between said electrode rollers, so that when an article to be welded is passed through between said electrode rollers on one side and said conductor roller on the other, the current may pass from one electrode roller successively through one portion of such article, said conductor roller, and another portion of such article, to said other electrode, one of said electrode rollers being spaced farther from said conductor roller than the other, whereby a lap joint may be passed through between said rollers, and said last named rollers having ribs adapted to engage the respectively adjacent edges of the article entering into such joint.

8. In mechanism of the character described, the combination with two roller electrodes of concavely curved conical form connected with opposite electric poles and supported with their smaller ends adjacent to, but out of contact with, each other; of a third conductor roller of convexly curved shape adapted to bridge the space between said electrode rollers, so that when an article to be welded is passed through between said electrode rollers on one side and said conductor roller on the other, the current may pass from one electrode roller successively through one portion of such article, said conductor roller, and another portion of such article, to said other electrode.

9. In mechanism of the character described, an electrode roller having its surface formed with helical grooves.

Signed by me, this 2nd day of August, 1913.

FRANK L. SESSIONS.

Attested by—
 H. B. FAY,
 JNO. F. OBERLIN.